(12) United States Patent
Hartway

(10) Patent No.: US 8,990,168 B1
(45) Date of Patent: Mar. 24, 2015

(54) EFFICIENT CONFLICT RESOLUTION AMONG STATELESS PROCESSES

(71) Applicant: EMC Corporation, Hopkinton, MA (US)

(72) Inventor: Michael D Hartway, Sammamish, WA (US)

(73) Assignee: EMC Corporation, Hopkinton, MA (US)

( * ) Notice: Subject to any disclaimer, the term of this patent is extended or adjusted under 35 U.S.C. 154(b) by 17 days.

(21) Appl. No.: 13/625,204

(22) Filed: Sep. 24, 2012

Related U.S. Application Data

(60) Provisional application No. 61/662,869, filed on Jun. 21, 2012.

(51) Int. Cl.
*G06F 17/30* (2006.01)

(52) U.S. Cl.
CPC .......... *G06F 17/30* (2013.01); *G06F 17/30144* (2013.01)
USPC ............ 707/687; 707/688; 707/689; 707/690

(58) Field of Classification Search
CPC ..................... G06F 17/30893; G06F 17/30197; G06F 17/30035; G06F 17/30058; G06F 17/30873; G06F 17/3089
See application file for complete search history.

(56) References Cited

U.S. PATENT DOCUMENTS

| | | | |
|---|---|---|---|
| 4,959,799 A * | 9/1990 | Yoshiura et al. ................ 706/48 |
| 6,225,995 B1 | 5/2001 | Jacobs et al. |
| 8,010,491 B2 * | 8/2011 | Edelstein et al. ............. 707/638 |
| 2004/0205414 A1 * | 10/2004 | Roselli et al. .................... 714/39 |
| 2009/0328155 A1 * | 12/2009 | Madathilparamgil et al. .... 726/4 |
| 2011/0276549 A1 * | 11/2011 | Fathalla ........................ 707/704 |
| 2013/0226886 A1 * | 8/2013 | Kamimura .................... 707/695 |

* cited by examiner

*Primary Examiner* — Anteneh Girma
(74) *Attorney, Agent, or Firm* — Van Pelt, Yi & James LLP

(57) ABSTRACT

A method, article of manufacture, and apparatus for efficient conflict resolution among stateless processes is disclosed. In some embodiments, a file system view request is sent to a process manager. A check is then made to ensure that a connection to the requested file system is available. A stateless process to interact with the file system is created, a stateless process to display the file system is created, and a state machine to check the validity of operational requests to be performed on the file system is also created. A display is then used to select one conflict resolution mechanism. A plurality of operational requests to interact with the file system is sent to the process manager. For each operational request, the state machine is used to check for valid requests. The valid requests are then performed. For each invalid operational request, the selected conflict resolution mechanism is used to determine whether to terminate or perform the invalid operational request. In some embodiments, software components are removed from the file system. In some embodiments, software components are added to the file system.

24 Claims, 5 Drawing Sheets

EFFICIENT CONFLICT RESOLUTION AMONG STATELESS PROCESSES

CROSS-REFERENCE TO RELATED APPLICATIONS

This application claims priority to U.S. Provisional Patent Application No. 61/662,869, filed Jun. 21, 2012, which is incorporated herein by reference for all purposes. This application is related to co-pending U.S. patent application Ser. No. 13/625,182 and filed concurrently herewith, which is incorporated herein by reference for all purposes.

BACKGROUND OF THE INVENTION

Modern data systems typically include many types of computers. In order to maximize use of physical computing resources, many of these data systems include virtualized machines. A single machine may potentially be turned into, for example, 10 virtual machines.

To ensure no loss of data on each of the virtual machines, each of the virtual machines will tend to require its own backup on a backup server. Users requiring access to these backups may initiate multiple requests to connect to the same backup.

By initiating multiple connections to a particular backup, users may potentially create inconsistent operational requests. For example, a user may attempt to restore the contents on backup "B16" to virtual machine "V16." The restore process might be lengthy and that same user may attempt to initiate a new connection an hour later to the same backup "B16" in order to modify or delete a single file. Because this additional request has been made during the processing of the restore request, one or both of these request operations may now fail.

Also, users may leave one or more connections to the backup open for an indeterminate amount of time. The process used to display the file system structure present on the backup may be a resource intensive process and can negatively impact performance of the operating system if it runs longer than necessary.

There is a need, therefore, for an improved method, article of manufacture, and apparatus for managing stateless processes.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
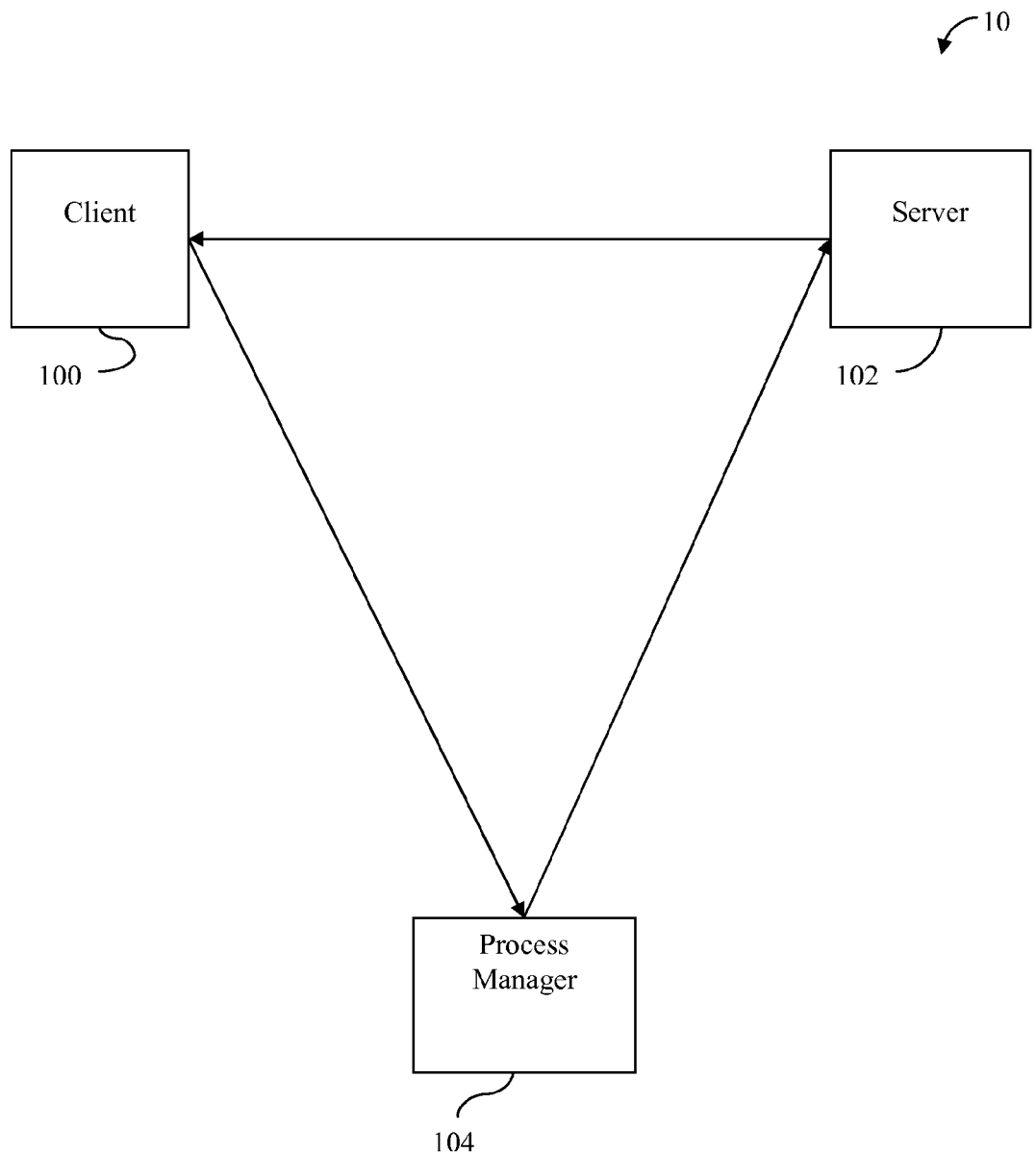
FIG. 1 is a diagram of a data system in accordance with some embodiments of the invention.

FIG. 1 illustrates a data system in accordance with some embodiments of the present invention. Data System 10 has Client 100, Server 102, and Process Manager 104. Client 100 initiates requests to Server 102. Server 102 stores backups that are accessed by Client 100. Process Manager 104 manages the potentially numerous requests sent back and forth between Client 100 and Server 102.

Although FIG. 1 illustrates Process Manager 104 being external to Server 102 and Client 100, in some embodiments, Process Manager 104 may reside in either Server 102 or Client 100. Further, Process Manager 104 may send some of the requests to a device outside of Data System 10.

Although FIG. 1 illustrates Process Manager 104 receiving responses from Server 102 before sending them to Client 100, in some embodiments, some types of responses from Server 102 may be sent directly to Client 100. Similarly, although FIG. 1 illustrates Process Manager 104 receiving requests from Client 100 before sending them to Server 102, in some embodiments, some types of request from Client 100 may be sent directly to Server 102.

By serving as the intermediary between requests sent by either Client 100 to Server 102 or by Server 102 to Client 100, Process Manager 104 is capable of managing stateless processes. For example, when a request is sent by Client 100 to modify a file stored on Server 102, the process used to modify that file can itself be stateless but Process Manager 104 will have the ability to manage this stateless process in a stateful way. This allows for meaningful management of numerous stateless processes, in order to minimize the potential for allowing the creation of conflicting processes.

For example, if a client has two open connections to a particular backup located on a particular server and the client initiates two inconsistent operational requests to the same file on that backup (e.g. one request to modify a file and a different request to delete that same file), then one or both of these processes may fail or remain in an ambiguous state. This may result in a corrupted file system on the server and a hung process on the client side. The file state ambiguity on the server may potentially lead to recovery problems and lengthy recovery times. The uncertain state of the process on the client side may lead to unwanted loss of memory and file system resources.

With a process manager, the management of stateless processes may be enhanced. In some embodiments, the process manager can be used to receive a request from a client machine and to check that there are no conflicting requests currently executing on resources provided by the server. With this information, the process manager can choose when and in what order to execute a series of potentially conflicting processes. If two conflicting requests are made (e.g.: one request to delete a file and then one request to edit that same file), the process manager in some embodiments might always choose to execute the first request made. This might mean that the second request cannot be completed, but with a process manager in place, notification can be provided to the user that the second request could not be completed. Moreover, once a conflicting request is handled gracefully, it can also be terminated gracefully, eliminating the potential for hung processes that cannot be terminated efficiently or gracefully. This helps enable efficient use of memory and file system resources (i.e.: avoiding hung processes) on the client side and results in less potential risk of file state ambiguity on the server side.

Alternatively, in some embodiments, the process manager might handle conflicting requests by seeking user input or by using a priority table to determine the order in which potentially conflicting processes should be handled. For example, if two conflicting requests are made (e.g.: one request to delete a file and then one request to edit that same file), the process manager in some embodiments might handle the conflict by using a display to generate a dialog that presents an option to the user of completing either the request to delete a file or the request to edit that same file. The process manager could then send the user-selected process to the server for execution and could also terminate the other process, avoiding the potential conflict. If the process manager is designed with a priority table, then the conflict could be handled by checking which process (editing or deleting a file) has been given a higher priority in the priority table. The process manager could then send the process with the highest priority to the server for execution and could also terminate the other process (and notify the user of this termination), avoiding the potential conflict. These alternative conflict resolution mechanisms also help enable efficient use of memory and file system resources on the client side (i.e.: avoiding hung processes) and result in less potential risk of file state ambiguity on the server side.

Figure 3:
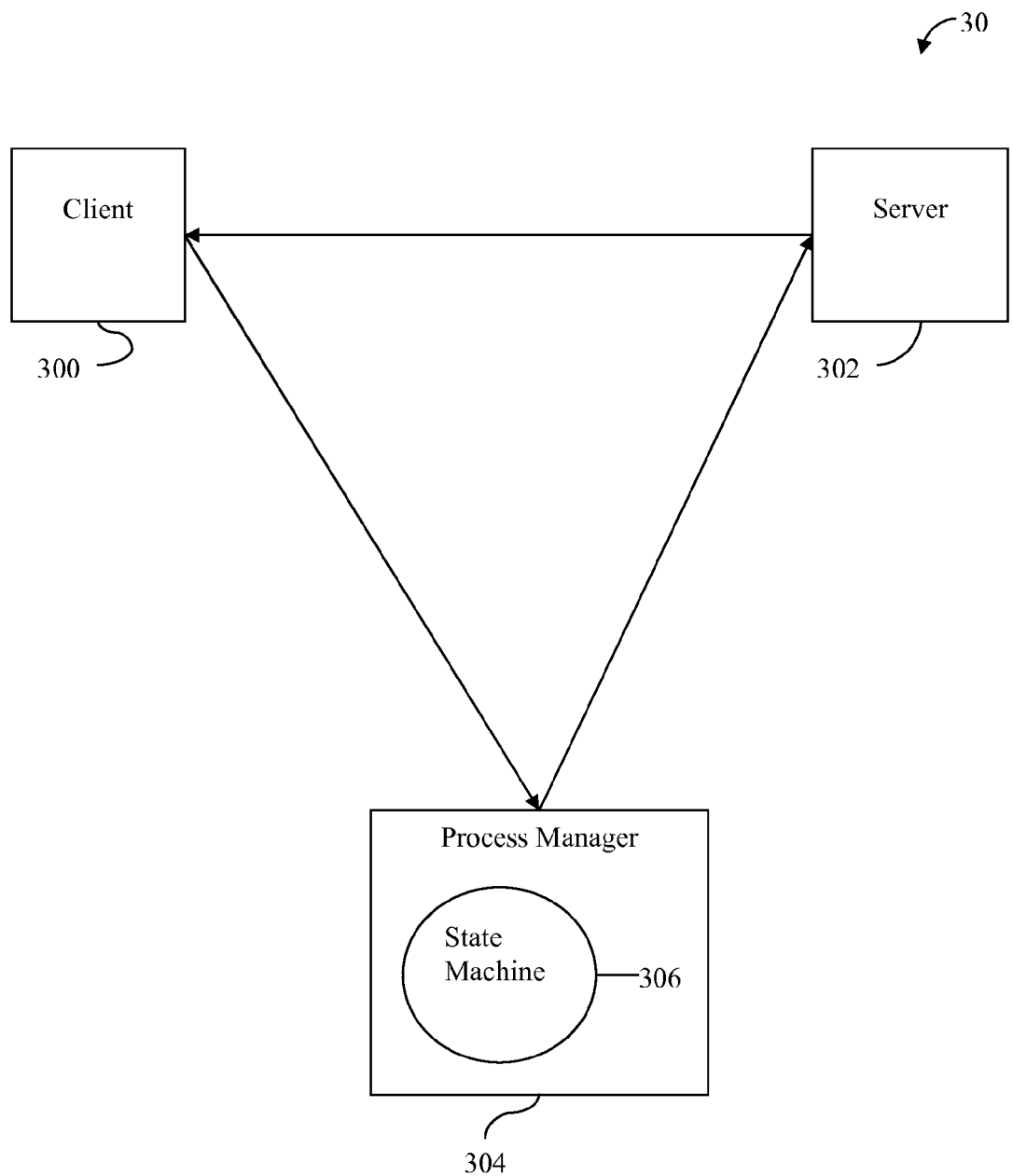
FIG. 3 is a diagram of a method for managing stateless processes that uses a state machine to ensure only valid requests are executed, in accordance with some embodiments of the invention.

Additionally, in some embodiments, such as Data System 30 shown in FIG. 3, Process Manager 304 may use State Machine 306 to help check the validity of requests from Client 300. State Machine 306 responds only to operational requests that are valid based on the current state of the file system. For example, if a user initiates a file system view request and then immediately initiates an operational request to browse that same file system, if the file system view request has not yet completed, then the operational request to browse the file system will likely fail. By using State Machine 306, the operational request to browse the file system can be checked against the current state of the file system. In the example provided, State Machine 306 might return a state of 'not mounted' (e.g.: because the file system resources from Server 302 have not yet reached Client 300) and State Machine 306 will not execute an operational request on a file system that has not yet been mounted. Process Manager 304 may then terminate the invalid operational request and use a display to notify the user of the failure. In a different example, if the file system has been mounted but a different operational request is currently being processed on the file system, then State Machine 306 might return a state of 'busy' and so Process Manager 304 might wait for a period of time until the file system's state is 'ready,' at which point the operational request can again be attempted. Thus, State Machine 306 is one embodiment of how to efficiently check the validity of operational requests.

Figure 2:
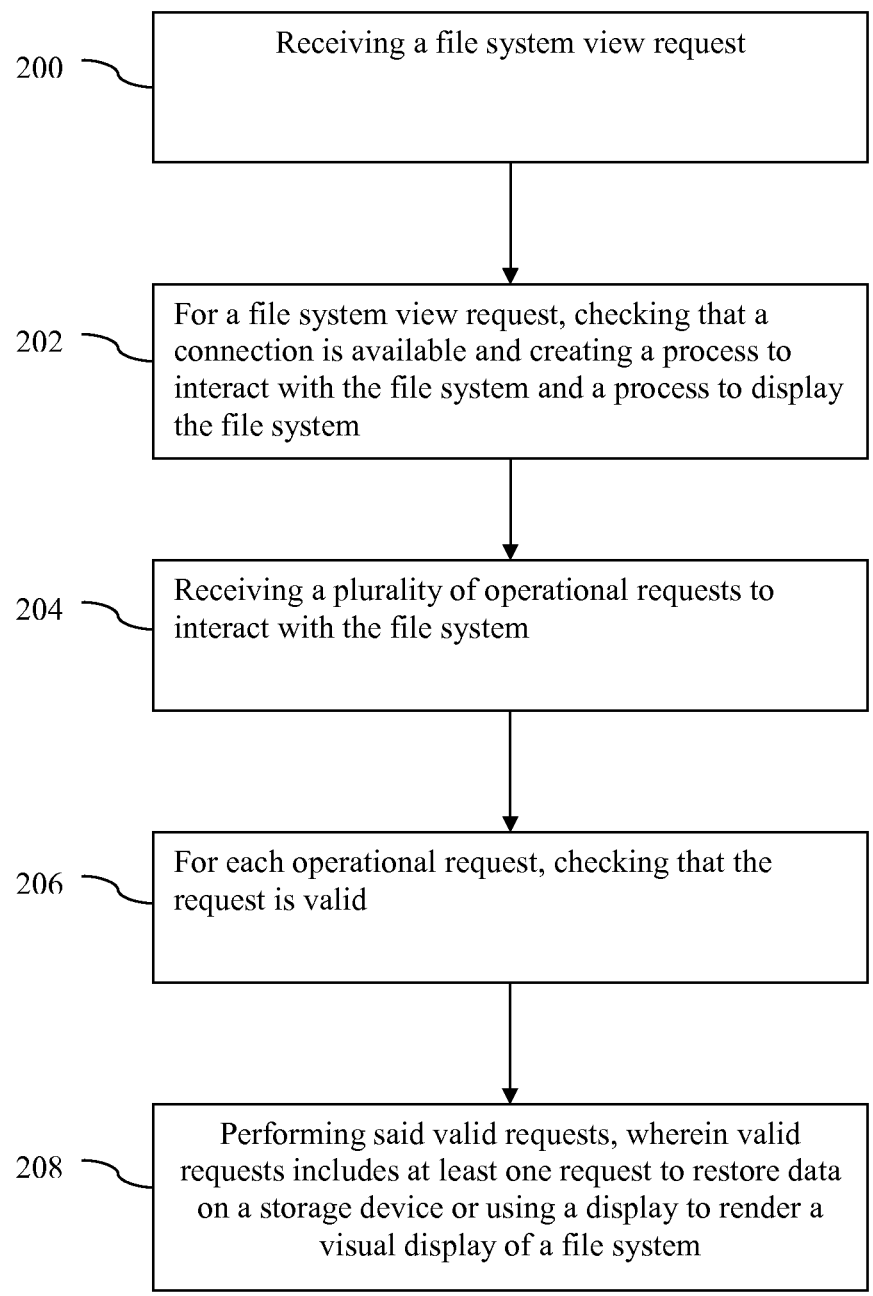
FIG. 2 is a flowchart of a method for managing stateless processes in accordance with some embodiments.

FIG. 2 is a flowchart of a method for managing stateless processes in accordance with some embodiments. The method shown in FIG. 2 may be performed by Process Manager 104 in FIG. 1. In the example shown, Process Manager 104 receives a file system view request at 200. At 202, Process Manager 104 checks to ensure that a connection to the file system is available. The Process Manager 104 further initiates processes to interact with and display the file system. Subsequent to receiving the file system view request, Process Manager 104 receives, at 204, one or more operational requests to interact with the file system. In some embodiments, operational requests to interact with the file system may include a request to browse the file system, modify a file, move a file, delete a file, browse a directory, create a new directories, delete a directory, and restore a different backed up version of the file system.

At 206, Process Manager 104 checks whether the operational requests received at 204 are valid. In one example, an operational request to interact with the file system (e.g., a request to browse the file system) may be received during the processing of the file system view request or of a different operational request. The Process Manager 104 must determine whether the file system is able to perform the operational requests received at 204. At 208, Process Manager 104 will cause the file system to perform only those operational requests that are determined to be valid. In some embodiments, an operational request is valid if the file system is capable of performing the operational request in its current state. In some embodiments, an operational request is valid if the file system's current state indicates that the file system is in a ready state. In the example provided, Process Manager 104 will not attempt the request to browse the file system if the file system is still in the process of being mounted in response to the initial file system view request. As another example, Process Manager 104 may wait to attempt additional operational requests if the file system is busy performing an earlier operational request.

Although FIG. 3 illustrates State Machine 306 being internal to Process Manager 304, in some embodiments, State Machine 306 may reside in Client 300, Server 302, or in some other external device or machine. Further, State Machine 306 may send some of the requests to a device outside of Data System 30 for further processing or validity analysis.

Figure 4:
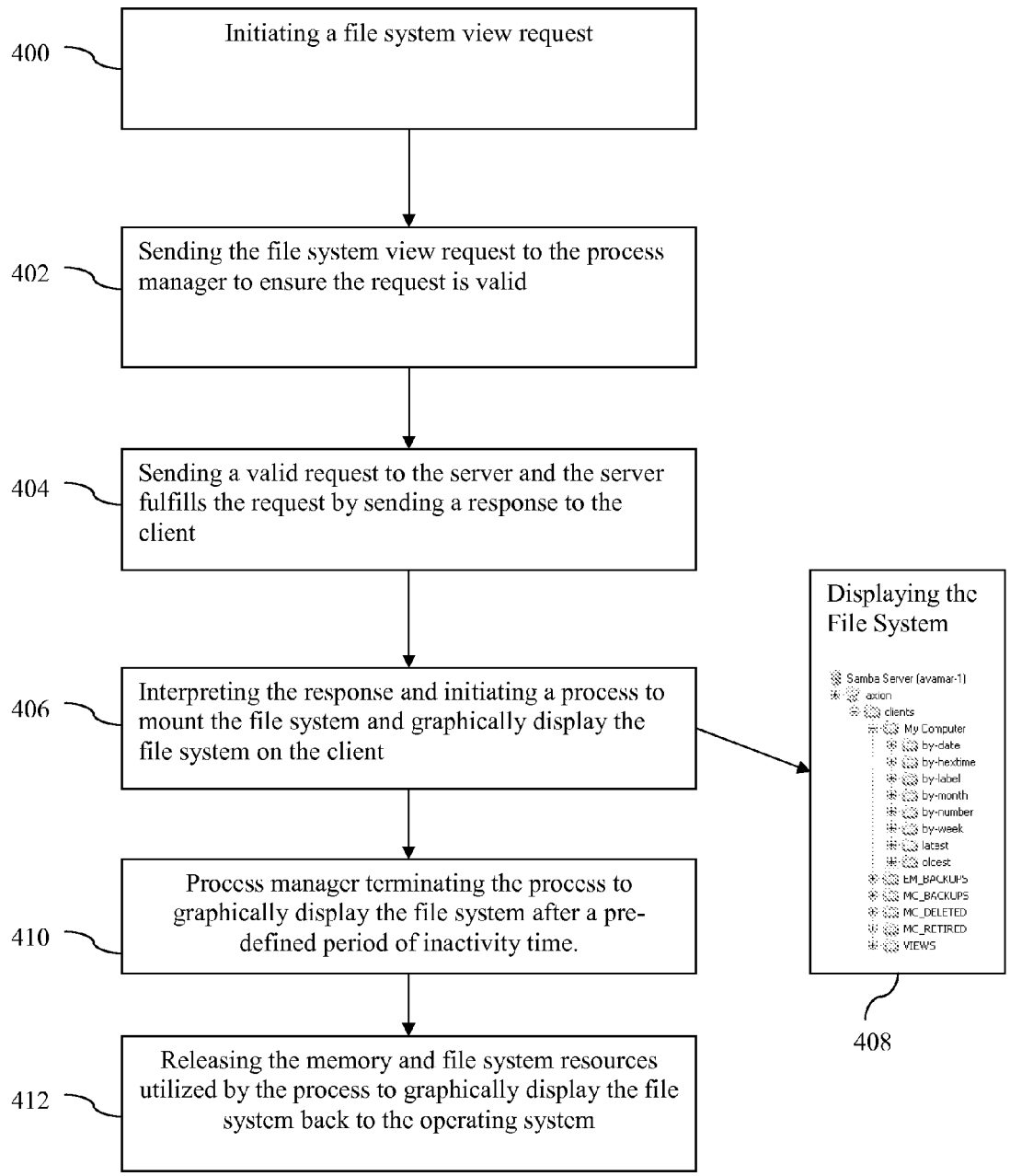
FIG. 4 is a flowchart of the lifecycle of a file system view request in accordance with some embodiments of the invention.

FIG. 4 is a flowchart of the lifecycle of a file system view request in accordance with some embodiments of a method for managing stateless processes, comprising initiating a file system view request in step 400, sending the file system view request to the process manager to ensure that the request is valid in step 402, sending a valid request to the server and the server fulfills the requests by sending a response to the client in step 404, interpreting the response and initiating a process to mount the file system and graphically display the file system on the client in step 406, displaying the file system in step 408, process manager terminating the process to graphically display the file system after a pre-defined period of inactivity time in step 410, and releasing the memory and file system resources utilized by the process to graphically display the file system back to the operating system.

In this way, the management of memory and file system resources may be enhanced. In some embodiments, a client may leave the graphical display of a file system open indefinitely, as a user may forget to close the process. In some embodiments, the process manager will include a configurable period of inactivity time for processes to graphically display a file system. Once this period of inactivity time for a particular process to graphically display a file system has been reached, the process manager will shut down said process and ensure that all system resources used by said process are released back to the operating system. This helps prevent unwanted loss of memory and file system resources.

Figure 5:
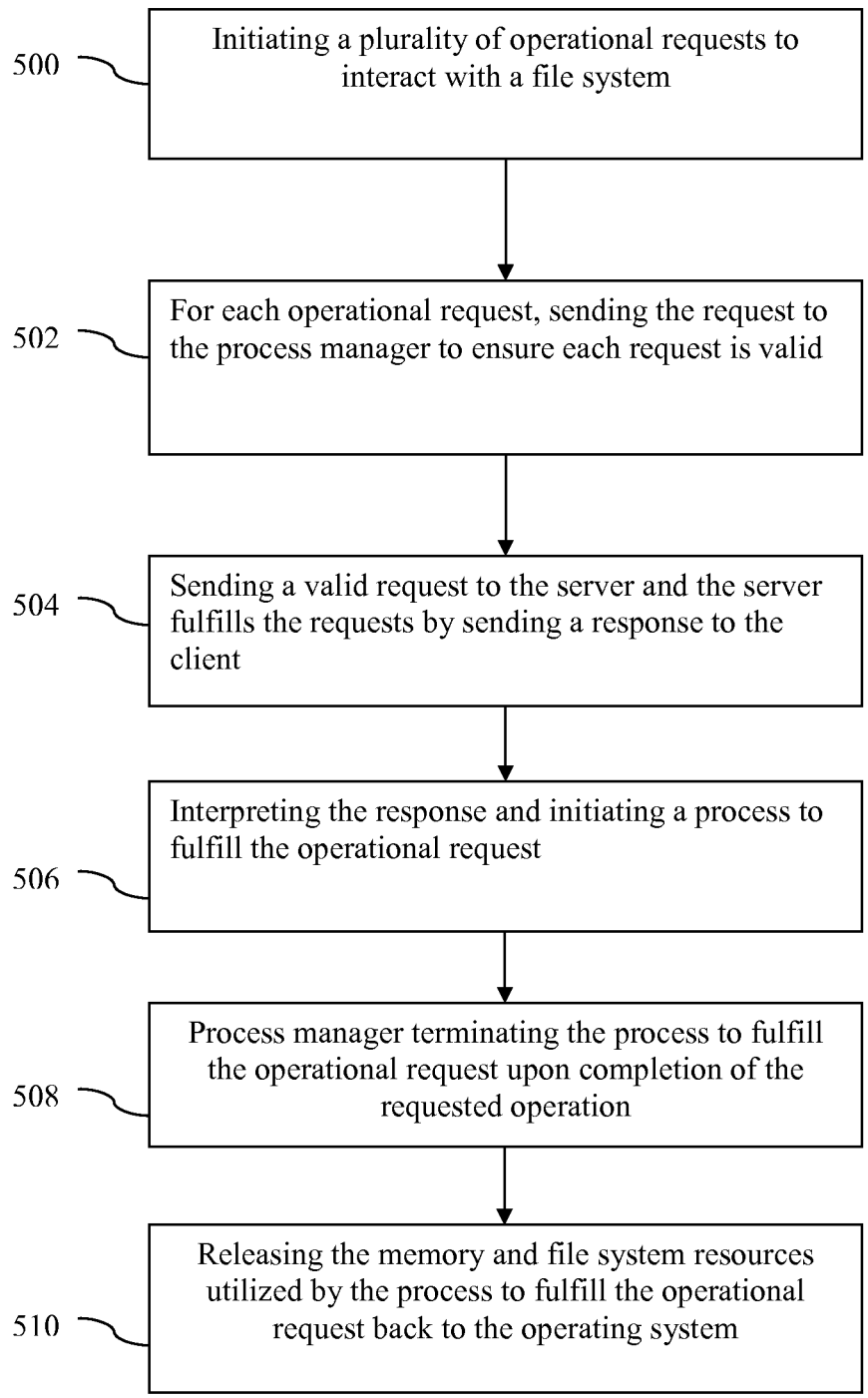
FIG. 5 is a flowchart of the lifecycle of an operational request in accordance with some embodiments of the invention.

In some embodiments, operational requests include all requests to interact with a file system, including but not limited to, modifying files, moving files, browsing directories, creating new directories, deleting files, deleting directories, and restoring a different backed up version of the file system. FIG. 5 is a flowchart of the lifecycle of an operational request in accordance with some embodiments of a method for managing stateless processes, comprising initiating a plurality of operational requests to interact with a file system in step 500, for each operational request, sending the request to the process manager to ensure each request is valid in step 502, sending a valid request to the server and the server fulfills the request by sending a response to the client in step 504, interpreting the response and initiating a process to fulfill the operational request in step 506, process manager terminating the process to fulfill the operational request upon completion of the requested operation in step 508, releasing the memory and file system resources utilized by the process to fulfill the operational request back to the operating system in step 510.

Though the process manager has been described as managing requests from a client to a server, the process manager is equally capable of managing requests or responses from a server to a client. Further, a Client 100, as illustrated in FIG. 1 need not be a physical client. It may be one of many virtual clients residing on a host machine. Similarly, Server 102, as illustrated in FIG. 1 need not be a physical server. It may be one of many virtual servers residing on a host machine.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for efficient conflict resolution among stateless processes, comprising:
   receiving, at a process manager, a file system view request;
   checking that a connection to the file system is available;
   creating a first process to interact with the file system and a second process to display the file system;
   determining a conflict resolution mechanism;
   receiving, at the process manager, a file system operational request to interact with the file system;
   determining whether the operational request is valid including by using a state machine associated with the file system to check the validity of the operational request based at least in part on a current state of the file system;
   in the event that the operational request is determined to be valid, performing the operational request on the file system; and
   in the event that the operational request is determined to be invalid, using the determined conflict resolution mechanism to determine whether to terminate or perform the operational request one the file system.

2. The method as recited in claim 1, wherein determining the conflict resolution mechanism includes selecting one of the following: a user-defined conflict resolution mechanism and a priority table.

3. The method as recited in claim 2, further comprising receiving manual input from the user comprising the user-defined conflict resolution mechanism.

4. The method as recited in claim 2, wherein the user-defined conflict resolution mechanism comprises a modified priority table.

5. The method as recited in claim 1, further comprising shutting down the first and the second process to respectively interact with and display the file system after a pre-defined period of inactivity time, including by ensuring that all system resources are released back to the operating system.

6. The method as recited in claim 4, further comprising setting a new time value for the pre-defined period of inactivity time.

7. The method as recited in claim 1, wherein the process manager is configured to respond to a stop request.

8. A system for efficient conflict resolution among stateless processes, comprising:
   a display device; and
   a processor coupled to the display device and configured to:
      receive a file system view request;
      check that a connection to the requested file system is available;
      create a first process to interact with the file system and a second process to display the file system on the display device;

determine a conflict resolution mechanism;
receive a file system operational request to interact with the file system;
determine whether the operational request is valid including by using a state machine associated with the file system to check the validity of the operational request based at least in part on a current state of the file system;
in the event that the operational request is determined to be valid, perform the operational request on the file system; and
in the event that the operational request is determined to be invalid, use the determined conflict resolution mechanism to determine whether to terminate or perform the operational request on the file system.

9. The system as recited in claim 8, wherein determining the conflict resolution mechanism includes selecting one of the following: a user-defined conflict resolution mechanism and a priority table.

10. The system as recited in claim 9, further comprising receiving manual input from the user comprising the user-defined conflict resolution mechanism.

11. The system as recited in claim 9, wherein the user-defined conflict resolution mechanism comprises a modified priority table.

12. The system as recited in claim 8, further comprising shutting down the first and the second process to respectively interact with and display the file system after a pre-defined period of inactivity time, including by ensuring that all system resources are released back to the operating system.

13. The system as recited in claim 12, further comprising setting a new time value for the pre-defined period of inactivity time.

14. The system as recited in claim 8, wherein the process manager is further configured to respond to a stop request.

15. A computer program product for efficient conflict resolution among stateless processes, comprising a non-transitory computer readable medium having program instructions embodied therein for:
receiving, at a process manager, a file system view request;
checking that a connection to the file system is available;
creating a first process to interact with the file system and a second process to display the file system;
determining a conflict resolution mechanism;
receiving, at the process manager, a file system operational request to interact with the file system;
determining whether the operational request is valid including by using a state machine associated with the file system to check the validity of the operational request based at least in part on a current state of the file system;
in the event that the operational request is determined to be valid, performing the operational request on the file system; and
in the event that the operational request is determined to be invalid, using the determined conflict resolution mechanism to determine whether to terminate or perform the operational request on the file system.

16. The computer program product as recited in claim 15, wherein determining the conflict resolution mechanism includes selecting one of the following: a user-defined conflict resolution mechanism and a priority table.

17. The computer program product as recited in claim 16, wherein the user-defined conflict resolution mechanism comprises a modified priority table.

18. The computer program product as recited in claim 15, further comprising shutting down the first and the second process to respectively interact with and display the file system after a pre-defined period of inactivity time, including by ensuring that all system resources are released back to the operating system.

19. The computer program product as recited in claim 18, further comprising setting a new time value for the pre-defined period of inactivity time.

20. The computer program product as recited in claim 15, further comprising responding to a stop request.

21. The computer program product as recited in claim 16, further comprising receiving manual input from the user comprising the user-defined conflict resolution mechanism.

22. The method as recited in claim 1, wherein the determined conflict resolution mechanism comprises waiting for a period of time until the file system's current state is 'ready' based at least in part on the state machine associated with the file system.

23. The system as recited in claim 8, wherein the determined conflict resolution mechanism comprises waiting for a period of time until the file system's current state is 'ready' based at least in part on the state machine associated with the file system.

24. The computer program product as recited in claim 1, wherein the determined conflict resolution mechanism comprises waiting for a period of time until the file system's current state is 'ready' based at least in part on the state machine associated with the file system.

* * * * *